United States Patent
Kawai

(10) Patent No.: US 11,098,869 B2
(45) Date of Patent: Aug. 24, 2021

(54) LAMP DEVICE

(71) Applicant: Stanley Electric Co., Ltd., Tokyo (JP)

(72) Inventor: Ryosuke Kawai, Yokohama (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/693,196

(22) Filed: Nov. 22, 2019

(65) Prior Publication Data
US 2020/0088375 A1 Mar. 19, 2020

Related U.S. Application Data

(63) Continuation of application No. PCT/JP2018/019177, filed on May 17, 2018.

(30) Foreign Application Priority Data

May 24, 2017 (JP) .............................. JP2017-102482

(51) Int. Cl.
*F21S 41/20* (2018.01)
*F21S 41/663* (2018.01)
(Continued)

(52) U.S. Cl.
CPC ........... *F21S 41/285* (2018.01); *F21S 41/143* (2018.01); *F21S 41/148* (2018.01); *F21S 41/153* (2018.01); *F21S 41/663* (2018.01); *F21V 5/02* (2013.01)

(58) Field of Classification Search
CPC ...... F21S 41/285; F21S 41/663; F21S 41/143; F21S 41/148; F21V 14/06
See application file for complete search history.

(56) References Cited

U.S. PATENT DOCUMENTS 4,868,718 A * 9/1989 Davenport ........... G02B 6/0008
362/511
2014/0175978 A1 6/2014 Kobayashi
(Continued)

FOREIGN PATENT DOCUMENTS

DE 10 2008 005488 A1 7/2009
DE 10 2013 112128 A1 5/2015
(Continued)

OTHER PUBLICATIONS

International Search Report of the International Search Report for PCT/JP2018/019177 dated Jul. 31, 2018.
(Continued)

*Primary Examiner* — Matthew J. Peerce
(74) *Attorney, Agent, or Firm* — Kenealy Vaidya LLP

(57) ABSTRACT

An object is to provide a lamp device which can be used as vehicle use headlight, and can form light distribution pattern capable of suppressing generation of dark grids in the field of view. A lamp device is provided which comprises a light source in which a plurality of light emitting elements are regularly arranged in a plane, and the light emitting elements are distributed along a first direction and along a second direction crossing the first direction in the plane, a projecting optic system capable of forming images of the respective light emitting elements of the light source on an image plane located on an optic axis of light beam emitted from the light source, and an image shifter capable of forming basic image of the plurality of light emitting elements on an image plane, and simultaneously forming first moved image which is formed by moving the basic image along the first direction and along the second direction simultaneously on the image plane.

17 Claims, 12 Drawing Sheets

(51) Int. Cl.
    *F21S 41/143*    (2018.01)
    *F21S 41/148*    (2018.01)
    *F21S 41/153*    (2018.01)
    *F21V 5/02*      (2006.01)

(56) References Cited

U.S. PATENT DOCUMENTS

2016/0356444 A1   12/2016  Ohno
2017/0088036 A1*  3/2017  Roeckl ................... B60Q 1/143

FOREIGN PATENT DOCUMENTS

| | | |
|---|---|---|
| DE | 10 2015 219211 A1 | 4/2017 |
| EP | 2 846 077 A2 | 3/2015 |
| EP | 2 898 256 A | 7/2015 |
| EP | 3 109 539 A1 | 12/2016 |
| EP | 3 263 978 A1 | 1/2018 |
| JP | 2013-054849 A | 3/2013 |
| JP | 2013-054956 A | 3/2013 |
| JP | 2014-207327 A | 10/2014 |
| JP | 2017-4661 A | 1/2017 |
| WO | 2014045168 A1 | 3/2014 |

OTHER PUBLICATIONS

Extended European Search Report for the related European Patent Application No. 18806604.7 dated Jan. 26, 2021.

* cited by examiner

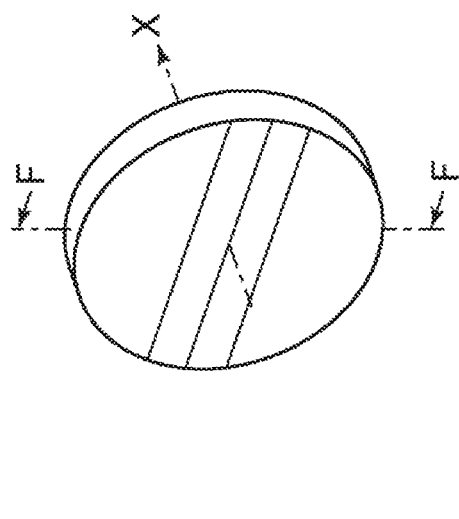
FIG. 10E
FIG. 10F
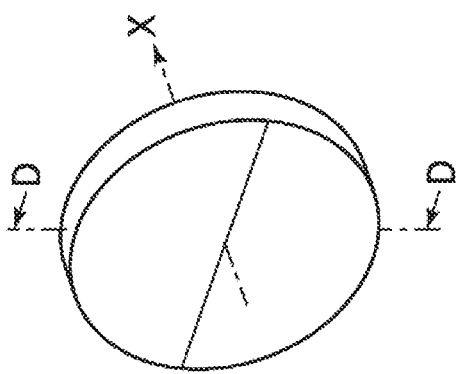
FIG. 10C
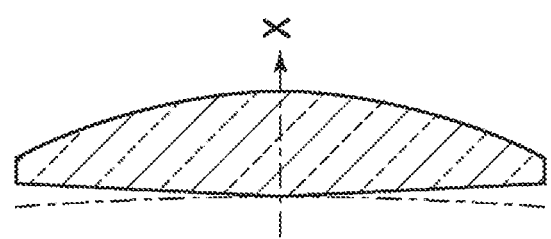
FIG. 10D
CROSS SECTION
ALONG LINE D - D
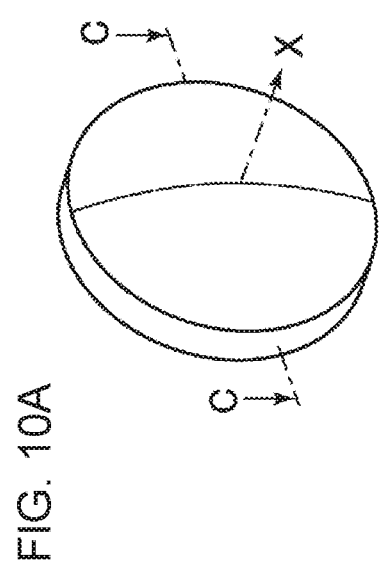
FIG. 10A
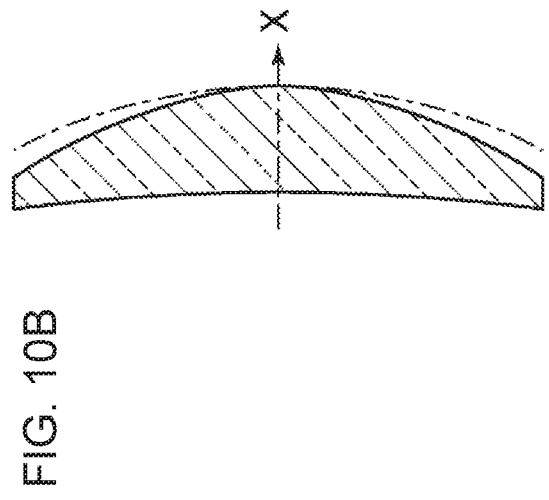
FIG. 10B
CROSS SECTION
ALONG LINE C - C

LAMP DEVICE

CROSS REFERENCE TO RELATED APPLICATION

This application is a PCT Bypass continuation application filed under 35 U.S.C. § 120 of PCT/JP2018/019177 filed on May 17, 2018 which is based on and claims the benefit of priority from Japanese Patent Application No. 2017-102482 filed on May 24, 2017, the entire content of each of which is incorporated herein in their entirety by reference.

BACKGROUND OF THE INVENTION

Field of the Art

This invention relates to a lamp device having a plurality of light emitting bodies, for example arranged in rows and columns (matrix) pattern, being capable of controlling turning on/off of a variable pattern, and of being used as a vehicle headlight.

Related Art

Recently, the technology in the vehicle headlight which controls in real time light distribution pattern in response to the front circumstances, i.e. existence or absence of an upcoming or foregoing vehicle, and the position thereof, is attracting attention. According to this technology, when an upcoming vehicle is detected in a running vehicle with headlights set in light distribution for running (high beam), only the region of the detected upcoming vehicle is shielded among the regions illuminated by the headlights. Therefore, it becomes possible to give the driver continuously a field of view nearly under the high beam, and at the same time to prevent giving glare to the upcoming vehicle.

Also, the headlight system which is linked or interlocked with steering operation and/or navigation system and moves in real time light distribution pattern in response to the travelling direction is becoming common. By widening the field of view in the direction to which the vehicle is going, safer driving responding to the circumstances becomes possible.

Such a variable light distribution type headlight system may be formed of a structure in which a plurality of semiconductor light emitting diodes (LED) are arranged in a matrix pattern to constitute a semiconductor light emitting element array, and conduction/non-conduction (turn-on/turn-off, ON/OFF) and making powers in the conduction state (brightness) of the respective LEDs are controlled in real time (for example, JPA 2013-54849 and JPA 2013-54956). For example, a plurality of LED chips capable of emitting visible lights are arranged on a substrate in a matrix pattern to constitute an LED chip array (light source) to which a drive power source capable of controlling the plurality of LED chips is connected. In front of the LED chip array, a projection lens for projecting emitted light pattern is disposed, to form a predetermined light distribution pattern by projecting the light pattern of the plurality of LED chips. There is also a proposal in which the sides of square light emitting elements are arranged to be slanted with respect to the vehicle width direction to be adapted to form slanted cut-off line.

When a plurality of LED chips are distributed in a matrix pattern on a substrate, it is impossible to nullify the distance between LED chips. Even when a plurality of LED chips are monolithically formed on a single growth substrate, a gap of an order of 10 μm will be formed between adjacent chips. When individually manufactured chips are discretely mounted on a substrate a gap of an order of 100 μm will be formed between adjacent chips. These gaps form non-light-emitting regions. When the emitted light pattern is directly projected on an (imaginal) image plane, a light distribution pattern having dark portions corresponding to the gaps will be formed. Even when a fluorescence layer is disposed on the light emitting surface of the LED chip array, the basic characteristics of the light distribution pattern does not change. For detecting objects steadily, it is desired to suppress the dark portions.

If the position of the LED chip array on the optic axis is set at a position nearer to the projection lens than the focal point of the projection lens, the projected light beams become diverging light beams and the dark portions between the LED chips become unclear or inconspicuous in the image of the light source. When the emitted light shapes of the adjacent LED chips overlap each other, the dark portions corresponding to the gaps between the chips can be made obscure or indistinct. However when the contours of the light emitting shapes of the LED chips become obscure, there arises another problem that in the case of forming light emitting area and non-light-emitting area contour of the light emitting area also becomes obscure.

An image shifting technique has been proposed in which two or more images are formed corresponding to one light source, and the positions of these two images are relatively shifted to mutually overlap so as to widen the resultant image of the light source. For example, rectangular light-emitting surfaces having opposing sides in x-axial direction and opposing sides in y-axial direction are disposed side by side in x-axial direction to dispose an image shifter (of triangular cross sectional shape) having two kinds of prism surfaces slanted in opposite direction with respect to xy-plane which orthogonally crosses the optic axis in z axis direction. Two kinds of light beams shifted in opposite directions in xz-plane are formed by refracting the light beams in opposite directions at the two kinds of prism surfaces, and are overlapped to form a projection image, to obtain an image elongated in x direction by the prisms (for example, JPA 2017-4661). The elongated image includes brightness distribution, but the contour is precise. Images of adjacent LED chips are individually expanded. It becomes possible to suppress the dark portions corresponding to the regions between chips, and to form projection image having precise contour.

In a case wherein the lighting pattern of an LED chip disposed in xy-plane is a rectangular pattern having sides parallel to vertical (y) direction and horizontal (x) direction, and a plurality of LED chips form a matrix pattern LED chip array arranged in vertical (column) direction and horizontal (row) direction, a plurality of dark grids elongated in the vertical direction and in the horizontal direction are formed. Light beams emitting from the respective LED chips are, for example, first shifted in the horizontal direction by a positive amount, zero amount, and a negative amount to form horizontally trisected light beams, which are then shifted in the vertical direction by a positive amount, zero amount, and a negative amount to form vertically also trisected light beams. It is possible to obtain a projection image having suppressed horizontal and vertical dark grid groups by overlapping horizontally trisected and vertically trisected light beams on an imaginary image plane.

When an image shifter is formed by forming triangular prisms having vertical ridge lines on one surface of a transparent plate and triangular prisms having horizontal ridge lines on the other surface of the transparent plate, it becomes possible to shift the images of respective light sources in opposite directions in parallel, and to overlap the shifted images in both the horizontal and vertical directions, enabling elongation of images and suppression of dark portions. It is also possible to form two kinds of triangular prisms of different top angles with the same ridge direction, enabling design of more appropriate light distribution.

FIGS. 9A-9C schematically illustrate an image shifter of circular disk shaped plate formed with prisms on both surfaces. FIG. 9A is a perspective view of light injecting surface, FIG. 9B is a perspective view of light emerging surface, and FIG. 9C is a cross-section illustrating cross sectional shape of prism on one surface. The prisms formed on the light injecting surface are assembly of triangular pillar-shaped prisms elongated in horizontal direction, and the prisms formed on the light emerging surface are assembly of triangular pillar-shaped prisms elongated in vertical direction. The slant angle of the prism slanting surface with respect to the surface of the plate member is exaggerated. FIG. 9D is a cross-section of an alternative example in which two kinds of the slant angle are set. In these image shifters, it is assumed that the LEDs of the light sources have rectangular shapes having opposing sides parallel to the shift direction of the image shifter.

It is also possible to form an image shifter by applying treatment on the lens surface of the projection lens (JPA 2014-207327). For example, when the emerging surface of the front stage projection lens is divided by a vertical division line into right and left two regions, and the lens surfaces of reference are rotated by a certain angle in mutually opposite directions around the division line, two kinds of rotated emerging light beams are obtained. When these light beams are overlapped, an image of the light source widened in horizontal direction can be obtained. When the injecting surface of the latter stage projection lens is divided by a horizontal division line into upper and lower two regions, and the reference lens surfaces are rotated by a certain angle in mutually opposite directions around the division line, two kinds of vertically rotated emerging light beams are obtained. When these light beams are overlapped, an image of the light source widened in vertical direction can be obtained.

It is possible to further divide the lens surface. For example, a lens surface can be divided by a central division line and side division lines on both sides which are in the same direction (for example vertical direction) into four regions, and the inside two regions and the outside two regions are paired and rotated by different angles, to form four light beams which are overlapped to form an elongated light source image.

FIGS. 10A-10D schematically illustrate an image shifter which is formed by dividing a lens surface and rotating the divided regions. As is illustrated in FIG. 10A, an emerging surface of a front stage lens is vertically divided on the optic axis into two regions. As illustrate in FIG. 10B, in the cross section along line C-C of FIG. 10A, reference surface(s) illustrated by dotted broken line are rotated to the positions illustrated by solid lines, to let the right and left two regions form different lenses and divide the focal points right and left. As is illustrated in FIG. 10C, an incident surface of a latter stage lens is horizontally divided on the optic axis into two regions. As illustrate in FIG. 10D, in the cross section along line D-D of FIG. 10C, reference surface(s) illustrated by dotted broken line are rotated to the positions illustrated by solid lines, to let the upper and lower two regions form different lenses and divide the focal points upper and lower.

A single lens surface may be divided into four regions. FIG. 10E illustrates a case where vertical four division is done in place of vertical two division in FIG. 10A. FIG. 10F illustrates a case where horizontal four division is done in place of horizontal two division in FIG. 10C.

In some planar light emitting LED chips, via electrode structure is employed as an electrode structure for contacting the lower semiconductor layer (for example, JPA 2014-207327). For example, on a semiconductor lamination in which an n-type layer, an active layer, and a p-type layer are laminated, a p-side electrode is formed on the p-type layer, via holes are formed through the p-type layer and the active layer to expose the n-type layer, and n-side via electrodes contacting the n-type layer are formed. Respective LED elements in an LED array including LED elements arranged in matrix pattern ordinarily have rectangular shape which is defined by opposing row direction sides and opposing column direction sides, and via electrodes are distributed at predetermined row directional positions and predetermined column directional positions in matrix pattern. The active layer is removed in the via holes to form non-light-emitting regions. The p-side electrode surface-contacting the surface of the p-type semiconductor layer and the via electrodes contacting the n-type semiconductor layer can be derived from the same surface.

SUMMARY OF THE INVENTION

When a light source in which a plurality of semiconductor light emitting elements are distributed in matrix pattern for forming light source of variable light distribution type and an image of the light source is formed using a projecting optic system, dark grids are generated between the images of the semiconductor light emitting elements in the image of the light source, corresponding to non-light-emitting regions between the adjacent semiconductor light emitting elements in the image of the light source. For the light source in which a plurality of light emitting elements are disposed in matrix pattern, dark grids extending in the row direction and in the column direction are generated.

In the case where dark grids are generated in the vertical direction and the horizontal direction, conventionally dark grids in the vertical direction and in the horizontal direction are suppressed by using image shifters for the horizontal direction and for the vertical direction. The image shifter for moving the image in the horizontal direction suppresses dark grids between the adjacent semiconductor light emitting elements in the horizontal (row) direction, but cannot suppress the dark grids between adjacent rows.

In an embodiment, it is an object to form a light distribution pattern capable of suppressing dark grids, using only a light source in which a plurality of light emitting elements are distributed in matrix pattern, a projection optical system, and an image shifter of one direction.

According to an embodiment of this invention, there is provided a lamp device comprising:

a light source in which a plurality of light emitting elements are regularly arranged in a plane, wherein said light emitting elements are located along a first direction and along a second direction crossing said first direction in said plane;

a projecting optic system capable of forming images of the respective light emitting elements of said light source on an image plane positioned on an optic axis of a light beam emitted from said light source; and an image shifter capable of forming basic images of said plurality of light emitting elements on the image plane, and

BRIEF DESCRIPTION OF THE DRAWINGS

FIGS. 10A-10D are perspective views and cross sections schematically illustrating image shifters in which a lens surface is divided into two regions and the divided surfaces are differently rotated, and FIGS. 10E and 10F are perspective views schematically illustrating image shifters in which a lens surface is divided into four regions and are differently rotated.

LEGENDS 201a flat portion, 201b right-side-down (left-side up) slant surface, 201c left-side-down (right-side-up) slant surface, 201A reverse trapezoid prism, IS image shifter, 201B forward trapezoid prism, 202 plate member, 203 original image, 204, 205 shifted image, AR array, G gap, 101 chip, VH via hole, VE via electrode, 21 semiconductor lamination, 22 n-type layer, 23 active layer, 24 p-type layer, 25 p-side electrode, 28 insulating layer, 29 n-side electrode, 100 vehicle headlight, 102 light distribution control unit, 103 front monitoring unit, 108 on-vehicle camera, 110 radar, 112 vehicle speed sensor, 120 driver (driving circuit).

EMBODIMENTS FOR CARRYING OUT THE INVENTION

As an embodiment of this invention, headlight system of on-vehicle lamp device will be considered. For affording sufficient visual sensibility for a vehicle driver in running at night, it is necessary to illuminate the front road surface and the above region thereof. When there is an upcoming car, however, it is not desirable to give glare to the driver of the upcoming car.

Figure 11A:
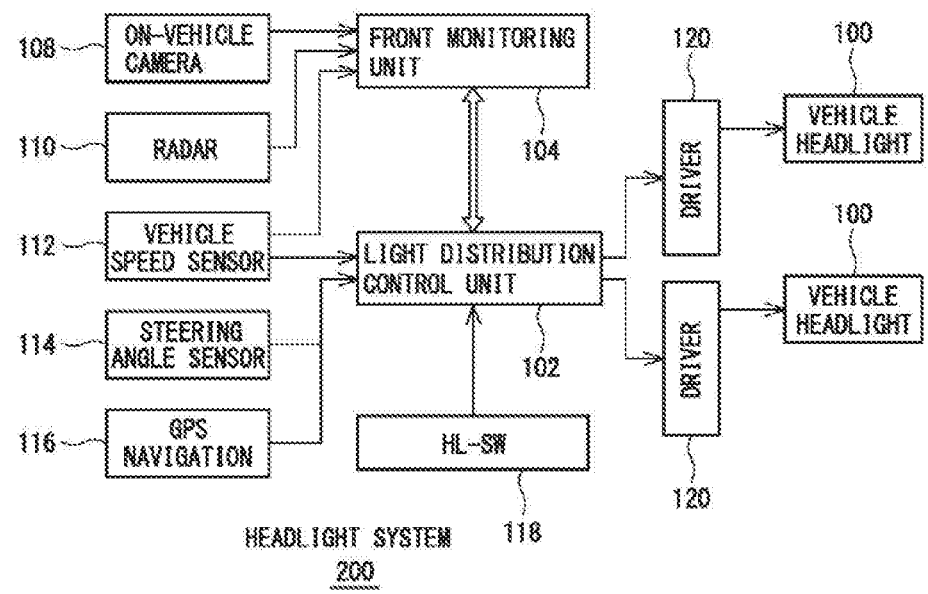
FIG. 11A is a block diagram illustrating schematic structure of a headlight system.

FIG. 11A is a block diagram illustrating a schematic structure of a headlight system. The headlight system 200 is equipped with respective left and right vehicle headlights 100, a light distribution control unit 102, a front monitoring unit 104, etc.

Figure 11B:
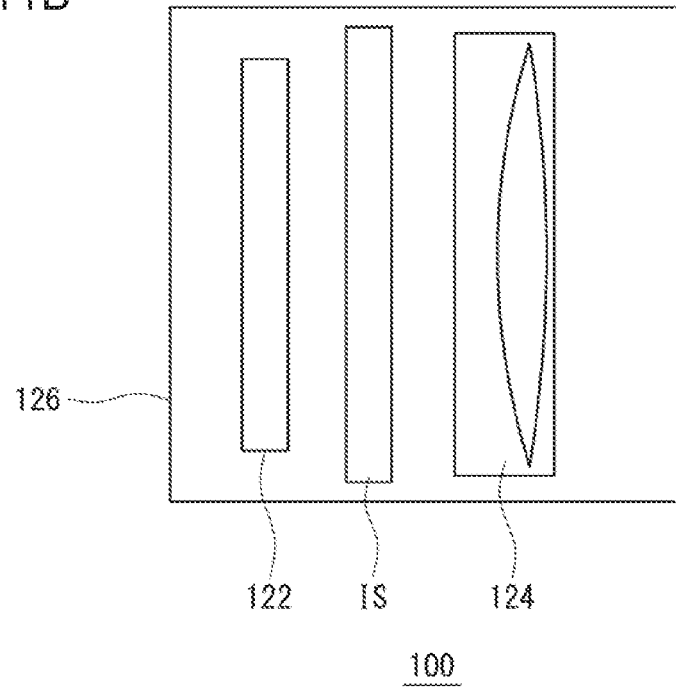
FIG. 11B is a block diagram illustrating schematic structure of a headlight.

As is illustrated in FIG. 11B, the vehicle headlight 100 comprises a light source 122 including matrix LEDs, an image shifter IS dividing the lights emitted from the light source into a plurality of groups and giving different shifts thereto, a projection optic system 124 including a projection lens for projecting these lights onto an image plane, and a lamp housing 126 accommodating these.

Returning to FIG. 11A, the front monitoring unit 104 connected with various sensors such as an on-vehicle camera 108, a radar 110, a vehicle speed sensor 112 performs image processing on the image data obtained from the sensors, to detect vehicles-in-front (upcoming vehicles and foregoing vehicles), other bright objects on the road and lane marks, and thereby calculates data, such as their attributes and positions, required for the light distribution control. The calculated data are transmitted to the light distribution control unit 102 and various on-vehicles units via an in-vehicle LAN and the like.

The light distribution control unit 102, which is connected to the vehicle speed sensor 112, the steering angle sensor 114, the GPS navigation 116, the headlight switch 118 etc., determines a light distribution pattern based on the attributes (upcoming vehicle, foregoing vehicle, reflector, road illumination) of the bright objects on the road, their positions (frontward, lateral) and the vehicle speed sent from the front monitoring unit 104. The light distribution control unit 102 determines control contents (turn-on/turn-off, making or thrown power, etc.) of respective LEDs of the matrix LED required for realizing the light distribution. The driver (driving circuit) 120 converts the information on the control amounts supplied from the light distribution control unit 102 into orders adapted to the activities of the drive units or the light distribution control elements, and controls them.

The vehicle headlamp should form brightness distribution which has high brightness at a central part (light distribution center), and gradually lowering brightness toward peripheries. In case of a vehicle headlamp using semiconductor light emitting element array, it is possible to control the driving power of the respective semiconductor light emitting elements to realize a desired brightness distribution.

The projection image of a light source in which rectangular light emitting bodies are distributed in matrix pattern, form dark grids along row direction and along column direction of the matrix. As a method for simultaneously extinguishing the row direction dark grids and the column direction dark grids, use of an image shifter for shifting the image in a slant direction which crosses both the row direction and the column direction will be discussed. When a matrix of rectangular light emitting bodies is moved in row direction (column direction), dark grids in the column direction can be suppressed, but the dark grids in the row direction (column direction) cannot be suppressed. If the direction of shift is set along a direction which is slanted with respect to the row direction and the column direction, it will become possible to extinguish the dark grids.

An image of a rectangular light emitting body is moved in a slanted direction on an image plane using an image shifter. If a corner portion of a rectangular light emitting body is moved in a slanted direction and the moved images are overlapped, triangular unevenness will be generated along the moving direction. For making the unevenness small, it will be desirable to overlap not only the images shifted in the moving direction, but also to overlap the original image without shift.

Figure 9A:
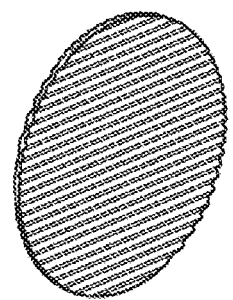
FIGS. 9A-9C are a schematic perspective view and a schematic cross section schematically illustrating an image shifter of circular disc palate having both surfaces formed with prisms.
Figure 9B:
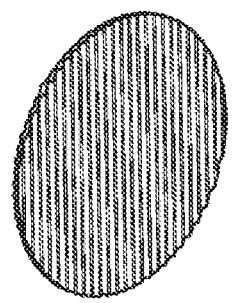
Figure 9C:
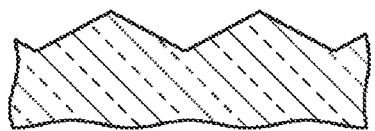
Figure 9D:
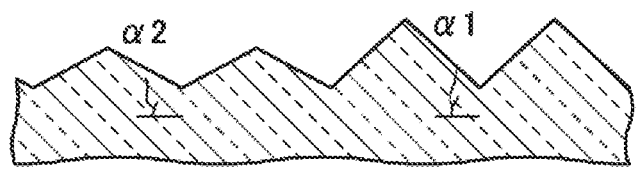
FIG. 9D is a schematic cross section of a prism in which two kinds of the slant angle are set.
Figure 9E:
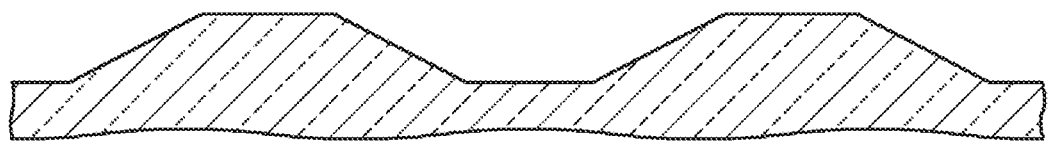
FIG. 9E is a schematic cross section of a trapezoidal prism.

Description on the image shifter having a prism has been made referring to FIGS. 9A-9D. As illustrated in FIG. 9E, when a trapezoid prism is formed including flat surfaces (parallel to the surface of a plate like member) perpendicular to the optic axis, in addition to the slanted surfaces, it is possible to overlap an image shifted in the two directions and an original image which proceeds straight on. FIG. 9E illustrates a combined shape of a forward or normal trapezoid prism having descending slanted surfaces on both sides of a flat surface and a reverse or inverse trapezoid prism having ascending slanted surfaces on both sides of a flat surface. It is possible to form only one of the forward trapezoid prism and the reverse trapezoid prism. It is also possible to add a flat surface at an optional place in a trigonal prism.

Also in the image shifter which has divided a lens surface and the divided surfaces are differently rotated, if the lens surface is divided into three parts and only the two parts on both sides are rotated, the central part forms an image of the original. It becomes possible to overlap moved shift images and the original image.

Figure 1A:
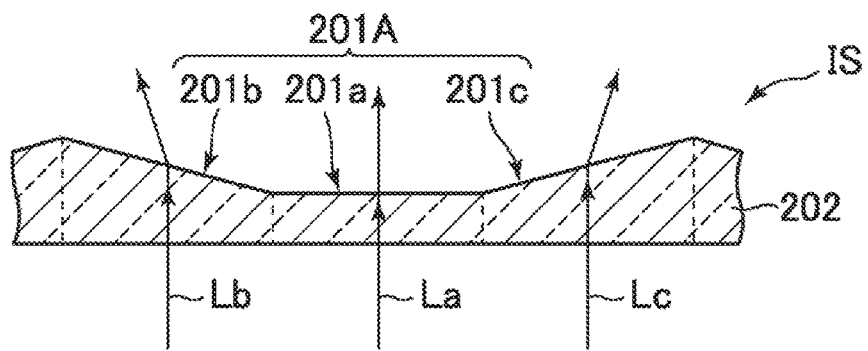
FIGS. 1A and 1B are cross sections schematically illustrating an reverse trapezoid image shifter and a forward trapezoid image shifter.

FIG. 1A is a cross section schematically illustrating a reverse trapezoid image shifter IS. The lower surface of a plate member 202 of transparent material is flat, and the incident light injects normally or perpendicularly. The upper surface is prism-processed to form trapezoid cross section, thereby forming a flat surface orthogonally crossing the optic axis at a central part, and slanted surfaces ascending from the flat surface on right and left sides. The flat surface constitutes a flat part 201a which allows the incident light La going straight on, the left-side-up slanted surface on the left side of the flat part constitutes left-side-up slanted part 201b which refracts the incident light Lb leftwards, and the right-side-up slanted surface on the right side of the flat part constitutes right-side-up slanted part 201c which refracts the incident light Lc rightwards. The flat part 201a and the left and right slanted part 201b and 201c jointly constitute unit of reverse trapezoid prism 201A.

A light beam La transmitting through the flat part 201a goes straight ahead, a light beam Lb transmitting through the left-side-up slanted part 201b displaces leftwards, and a light beam Lc transmitting through the right-side-up slanted part 201c displaces rightwards, forming three light beams. Here, the cross-sectional shape illustrated in the figure continues in a direction perpendicular to the figure sheet, and is repeated in the left-and-right direction in the figure sheet.

Figure 1B:
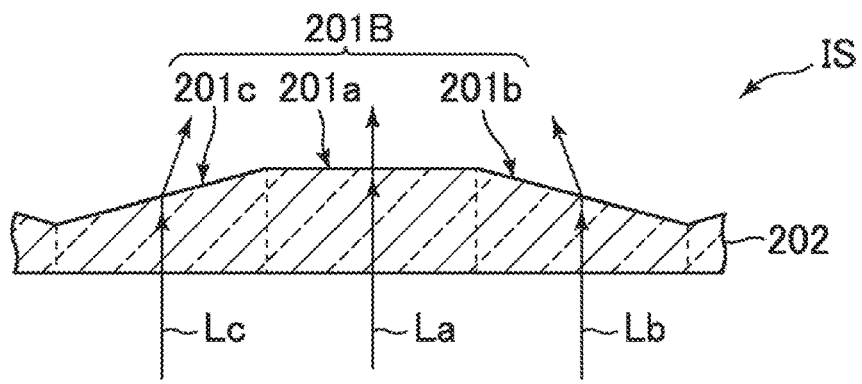

FIG. 1B is a cross section schematically illustrating a forward trapezoid image shifter IS. The lower surface of a plate member 202 of transparent material is flat, to which the incident light injects perpendicularly. The upper surface is prism-processed to form a trapezoid cross section, thereby forming a flat surface orthogonally crossing the optic axis at a central part, and slanted surfaces descending from the flat surface on right and left sides. The left-side-down (right-side-up) slanted part 201c is disposed on the left side of the flat part 201a and the right-side-down (left-side-up) slanted part 201b is disposed on the right side of the flat part 201a, constituting a forward trapezoid prism 201B.

Although there arise some alterations in the optical paths in the neighborhood of the prism between the reverse and forward trapezoid prisms, the basic function is common to the both prisms that the prism generates a straight going beam, a leftward refracting beam, and a rightward refracting beam. Hereinafter, the reverse trapezoid prism and the forward trapezoid prism are collectively called as trapezoid prism, unless otherwise specified. Those prisms in which flat parts are disposed at both of top side part and bottom side part of the slanted part will also be included in the trapezoid prism.

Figure 1C:
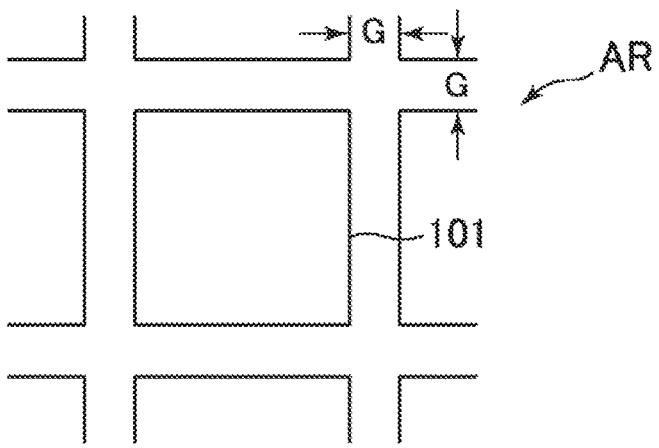
FIG. 1C is a plan view schematically illustrating a two-dimensional array shaped light source in which a plurality of rectangular LED chips are arranged in matrix pattern.

As is illustrated in FIG. 1C, a plurality of semiconductor light emitting diode (LED) chips 101 are disposed in matrix pattern to constitute an LED array AR. The planar shapes of the respective chips are mostly square-shaped or rectangle-shaped. It is assumed here that the respective chips 101 emit light in the whole areas and the adjacent chips are separated by a gap G. When such an LED array is driven to emit lights, and the emitted lights are projected directly on an imaginary image plane, the light distribution pattern on the imaginary image plane reflects the distribution of the chips 101, to form dark portions (dark grids) of low brightness between the respective illuminated regions. Now, discussion will be made on moving the images of the chips 101 in a diagonal direction using an image shifter.

Figure 1D:
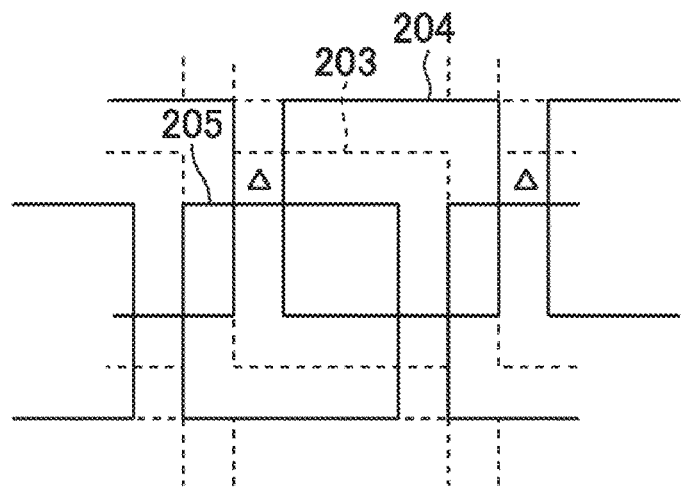
FIG. 1D is a plan view schematically illustrating rectangular images of the light source formed by light beams after passing through the image shifter.

FIG. 1D is a schematic plan view illustrating a state wherein emerging lights of the LED array AR of FIG. 1C are shifted in directions along a diagonal line connecting the lower left corner and the upper right corner and are overlapped. The original image of the light source formed without the image shifter is illustrated in broken lines, and the images shifted in both senses along the diagonal direction by an image shifter are illustrated in solid lines. If only the images shifted by the image shifter are overlapped, the regions marked with Δ will not be illuminated. Dark portions are generated in the field of view. If some object to be recognized exists in the dark portion, there is a possibility that the driver cannot recognize it.

In case when dark grids are to be extinguished by using only an image shifter of one direction, it is preferable to use a trapezoid prism for forming a straight going image and images moved in both sides, or a divided lens surface image shifter for forming a straight going image and images moved in both sides.

Figure 2A:
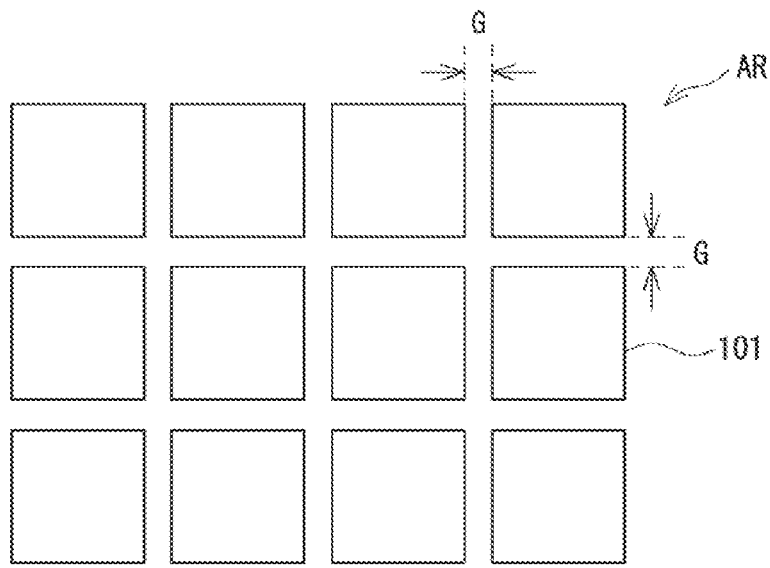
FIGS. 2A-2C are a plan view schematically illustrating an LED array AR including a plurality of LED chips 101 according to an embodiment, a diagram schematically illustrating the image shifting direction by the image shifter IS, and a plan view schematically illustrating three kinds of images of the LED array AR projected through the image shifter on an imaginary image plane.
Figure 2B:
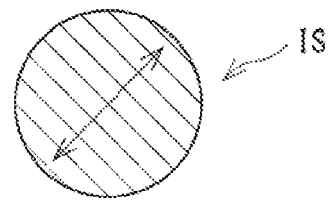

FIG. 2A is a plan view schematically illustrating an LED array AR including a plurality of LED chips 101, and FIG. 2B is a plan view schematically illustrating an image shifter IS for forming a straight going image of the LED array and images moved in two directions along the slanted direction in the LED array according to an embodiment.

As illustrated in FIG. 2A, the LED array AR includes a plurality of chips 101 aligned in row direction and column direction through gap G. In the embodiment, the respective LED chips have a shape of almost square. FIG. 2B is a plan view schematically illustrating an image shifter IS for forming an image in the straight forward direction, and simultaneously moving the image in both senses of a slanted direction. Two images moved in both senses of a slanted direction are formed sandwiching a straight-going image, the slanted direction being a direction slanted from the row direction and the column direction of the array (for example, 45 degrees-225 degrees direction in the field of view).

The image shifter is designed in a structure having slanted surfaces elongated in a direction crossing the row direction and the column direction, which are the aligning direction of the array. It has a trapezoid prism cross section, in which both the slanted surfaces cross the row direction and the column direction at 45 degrees. The direction in the image plane in which the image is moved by the image shifter is a direction orthogonally crossing the elongated direction of the slanted surfaces.

Figure 4A:
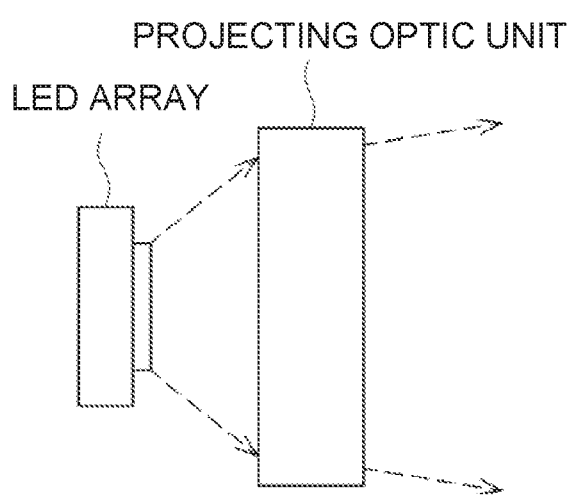
FIGS. 4A and 4B are schematic diagrams schematically illustrating two kinds of image formation by light beams emitted from the LED array through two kinds of projection optics.
Figure 4B:
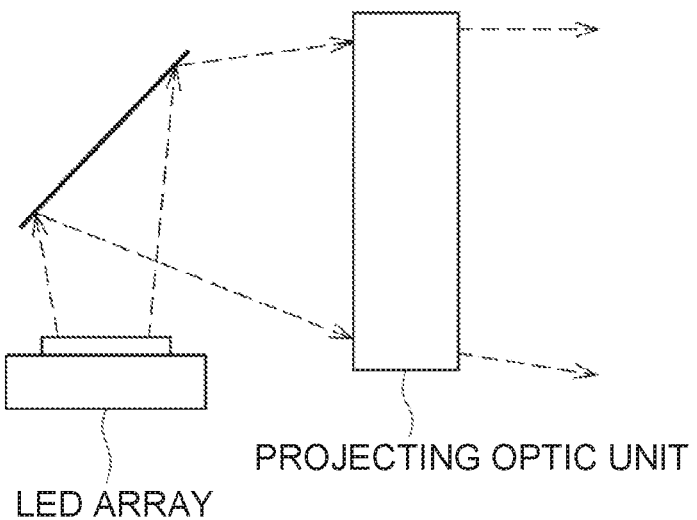

The positional relationship between the array and the image shifter is a positional relationship in the state when the illumination from the LED array impinges the image shifter, and does not necessarily limit the positional relationship in the real lamp device. It is only necessary that the aligning direction of the LED array crosses the elongated direction of the slanted surface of the image shifter, as stated above. For example, in the case of FIG. 4A, LED illuminating surface lies at a position opposing the incident surface of the projection optics system, and hence the aligning direction of the array and the elongated direction of the slanted surface of the image shifter actually crosses each other. As in FIG. 4B, when the illuminated image of the array is reflected by a mirror surface, and transmits through the image shifter, it is only necessary that the aligning direction of the array image by the reflected lights crosses the elongated direction of the slanted surface of the image shifter as stated above.

Figure 2C:
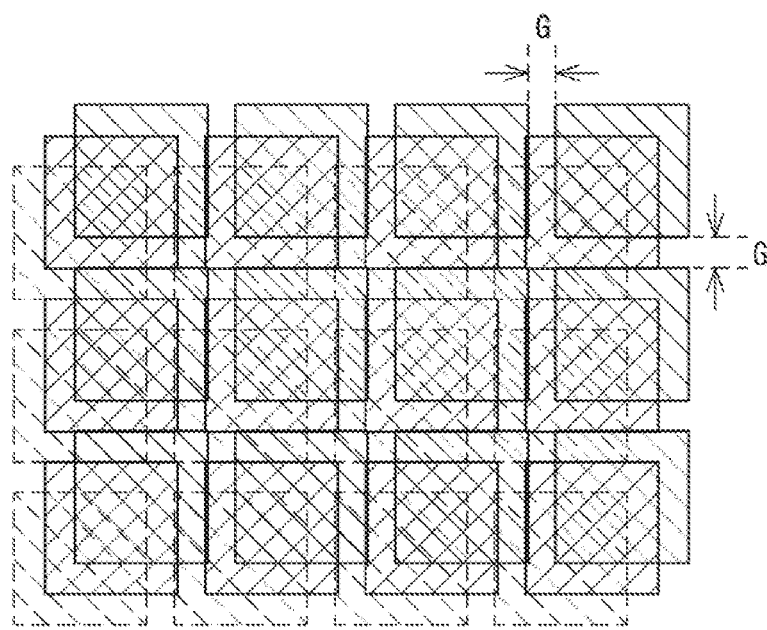

FIG. 2C is a plan view schematically illustrating the image of the LED array AR formed by projecting light beams emitted from the light source through an image shifter. An original image formed by straight going light beam and images shifted from the original image to upper right direction and to lower left direction are formed. Since two images shifted to upper right direction and to lower left direction are formed in superposition, dark grids which existed in the upper and lower row directions and left and right column directions adjacent to the original image are extinguished. Although an example of an image formed by shifting the original image to left and right by gap G and to up and down by gap G is exemplified, it is only necessary that the distance of the image shifting is G or more, and the shifted image does not exceed.

For example, the shape of the LED chip is a square shape having opposing sides along horizontal direction and vertical direction, and the image shifter shifts the image in the direction of 45 degrees-225 degrees. The horizontal direction is arranged to correspond to the vehicle width direction so as to be adapted to vehicle headlamp. Appropriate brightness distribution is formed by adjusting brightness distribution in the horizontal direction and the vertical direction.

Figure 3A:
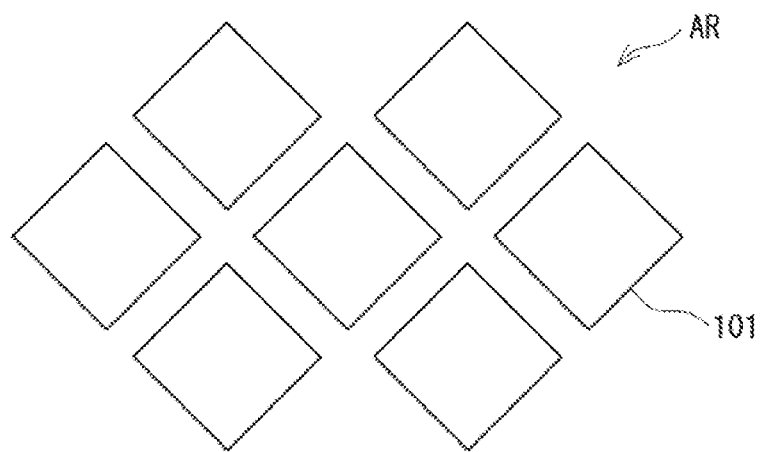
FIGS. 3A-3C are a plan view of an LED array corresponding to a state of the LED array of FIG. 2A slanted by 45 degrees, a diagram schematically illustrating the image shifting direction of the image shifter IS, and a plan view schematically illustrating three kinds of images of the LED array AR of FIG. 3A projected through the image shifter of FIG. 3B on an imaginary image plane.
Figure 3B:
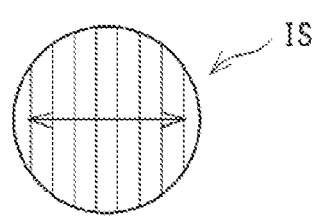
Figure 3C:
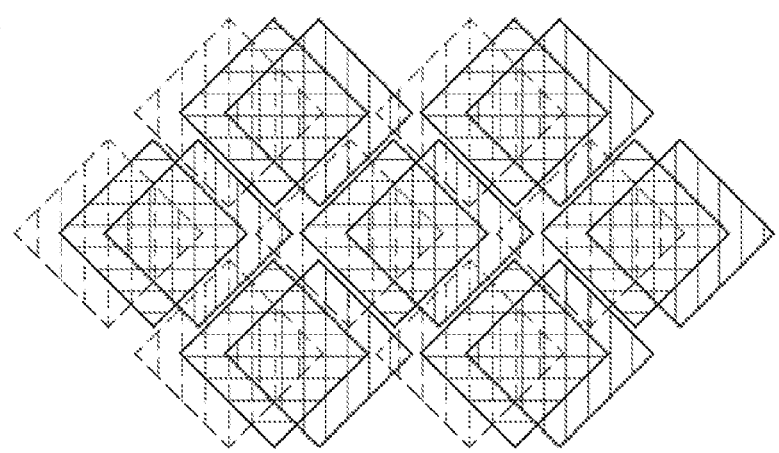

FIGS. 3A-3C are figures corresponding to FIGS. 2A-2C, setting the row direction and the column direction of the LED array in slanted directions, and the shifting direction of the image by the image shifter in horizontal direction. As illustrated in FIG. 3A, LED chips of square shape are aligned in 45 degrees-225 degrees direction at regular interval and the diagonal directions of the respective chips are aligned in the horizontal direction and the vertical direction. The image shifter IS of FIG. 3B forms a straight going light beam and two light beams shifted in two directions sandwiching the straight going beam. As illustrated in FIG. 3C, the respective LED chips have diagonal lines aligned in the horizontal direction, and each LED chip forms three images aligned in the horizontal direction. Images have opposing sides in the 45 degrees direction and the 225 degrees direction. Here, the light source is rotated by 45 degrees, and hence the shape of the illumination field projected on an imaginary image plane becomes a diamond like shape.

The alignment direction in the array is the direction in which the sides of the rectangle LED chips oppose to each other. Namely, ±45 degrees are the arrangement directions in the array. It holds in such array disposition also that it is only necessary that the aligning direction of the LED arrays cross the elongated direction of the slanted surfaces of the image shifter.

FIG. 3B illustrates an elongated direction of slanted surfaces of the image shifter and the direction of shifting the images. The slanted surfaces are elongated in parallel to the column direction and the images are shifted in parallel to the row direction. Here, dark portions may also be distinguished in similar way in the case where the slanted surfaces are elongated in parallel to the row direction and the images are shifted in parallel to the column direction.

Figure 5A:
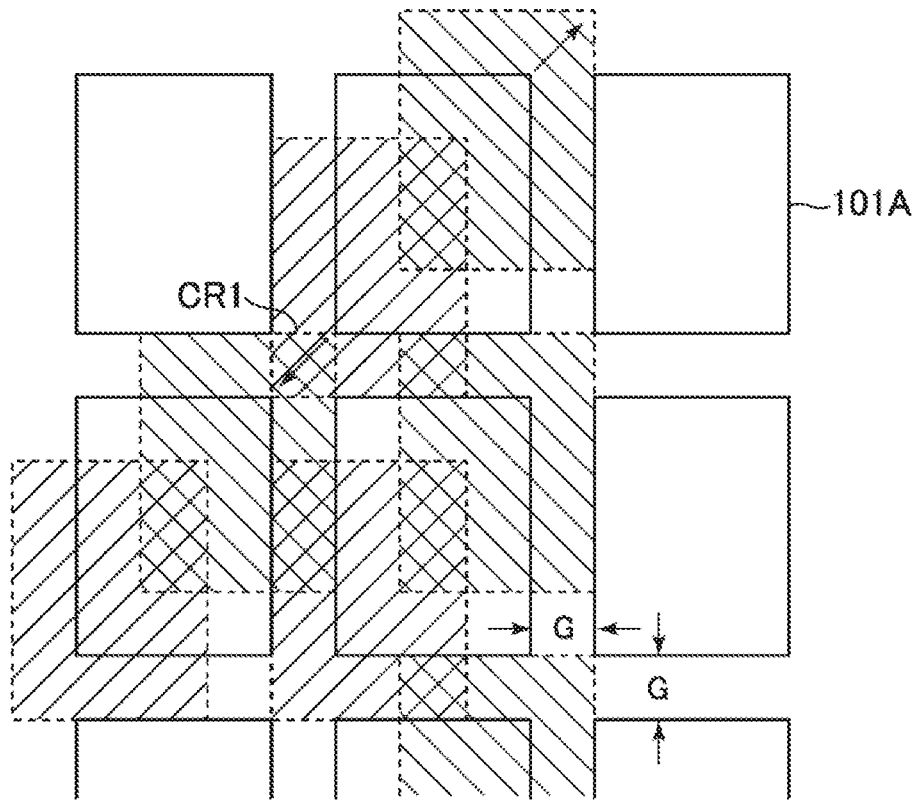
FIGS. 5A and 5B are plan views schematically illustrating images of LED arrays each including LED chips 101A projected through image shifters on imaginary image planes according to two alternative examples.
Figure 5B:
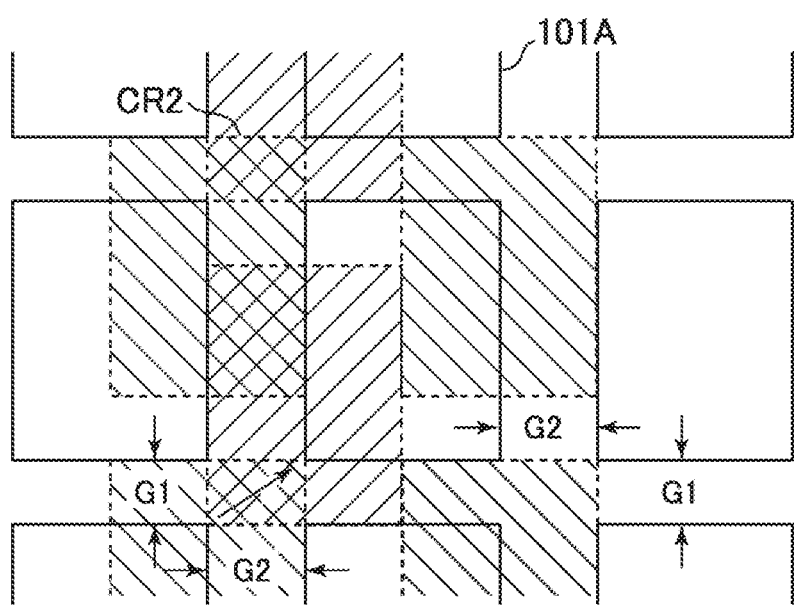

FIGS. 5A and 5B are plan views schematically illustrating two examples of LED array AR according to alterations. LED chips 101A have a rectangular shape long in height direction and are distributed along the horizontal rows and vertical columns. The shape of the crossing region between the horizontal direction dark grids and the vertical direction dark grids have opposing sides in the horizontal (row) direction and the vertical (column) direction, and are square shaped (FIG. 5A) or horizontally long rectangle shaped (FIG. 5B).

In the case of FIG. 5A, widths of the horizontal dark grid and the vertical dark grid are constantly both G, and the crossing region of the dark grids is a square shape with side G. For distinguishing this dark grid, a shift in the horizontal (row) direction and a shift in the vertical (column) direction, each being not less than distance G can be done. For example, as illustrated in the figure, shifts may be done in the upper right angle of 45 degrees and in the lower left angle of 45 degrees and the shifted images may be overlapped on the original image.

In the case of FIG. 5B, the width (height) of the horizontal direction dark grid is G1, and the width of the vertical direction dark grid is G2 (=G1×2), thus the crossing region of the dark grids is horizontally long rectangle. For distinguishing the dark grids by superposing two shifted images, shift of G2 or more in the horizontal direction and shift of G1 or more in the vertical direction may be done. In either case, the diagonal line of the crossing region of dark grids may be adapted as reference of shift.

Figure 6A:
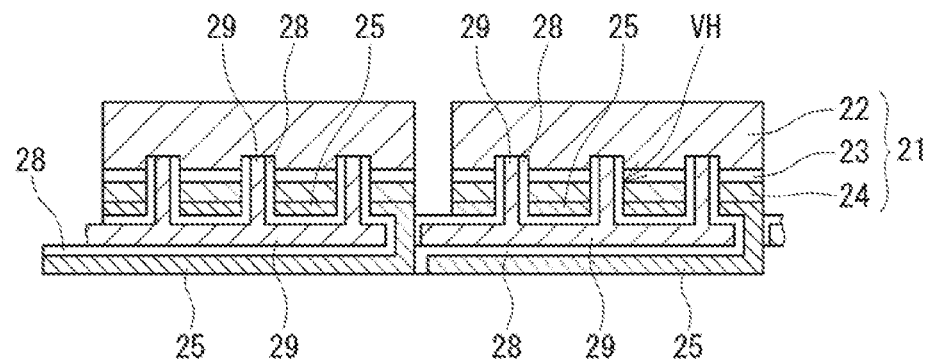
FIG. 6A is a cross section schematically illustrating a structure of a semiconductor LED having via holes.

FIG. 6A is a cross section schematically illustrating a structure of a semiconductor light emitting diode (LED)

chip. Semiconductor lamination 21 of an n-type layer 22, an active layer 23, and a p-type layer 24 constitutes a light emitting diode (LED) structure. The semiconductor lamination 21 is formed by growing GaN-inclusive semiconductor layers on a growth substrate such as sapphire by molecular beam epitaxy (MBE), in which the growth substrate is removed after the epitaxial growth. A p-side electrode 25 is formed on the p-type layer 24. A mask or the like is formed on the p-side electrode 25, and the p-side electrode 25, the p-type layer 24, and the active layer 23 are etched down to form via holes VH exposing the n-type layer 22. After the mask is removed and an insulating layer 28 is deposited, the n-type layer is exposed at the bottom of the via holes VH and n-side electrodes 29 are formed. The p-side electrode 25 and the n-side electrode 29 are derived respectively independently. The via holes VH are distributed as being aligned along the row direction and the column direction.

Figure 6B:
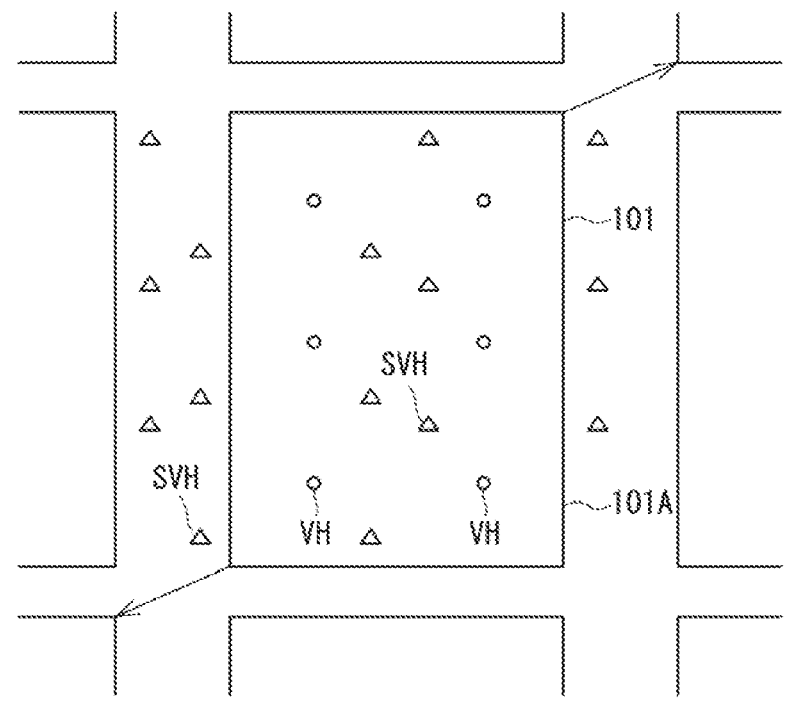
FIG. 6B is a schematic plan view illustrating when the structure of FIG. 5B has via holes how the images of the via holes are shifted.

FIG. 6B illustrates a case where upper and lower sides of the rectangular chip 101 are sandwiched by narrow dark grids, the left and right sides of the chip 101 are sandwiched by wide dark grids, each chip 101 has via holes VH, and the image shifter performs shifting in the direction of a diagonal line of the dark grid crossing region. This may correspond to a case where plural LED chips aligned in the column direction are formed monolithically, and the LED chips arranged in the horizontal direction are individually manufactured. Via holes are distributed at 6 positions in 3 rows and 2 columns.

When the image shifter performs shifting in the horizontal direction or the vertical direction, the images of the via holes are arranged on the horizontal direction or the vertical direction, letting concentration or assembly of via holes conspicuous. When the shifting by an image shifter is done in the direction of a diagonal line of the crossing region of the dark grids, the original via hole distribution and the shifted via hole distribution can be based on completely different criteria, and it becomes possible to avoid concentration or assembly of via holes even when shifted via holes SVH are added.

Figure 7:
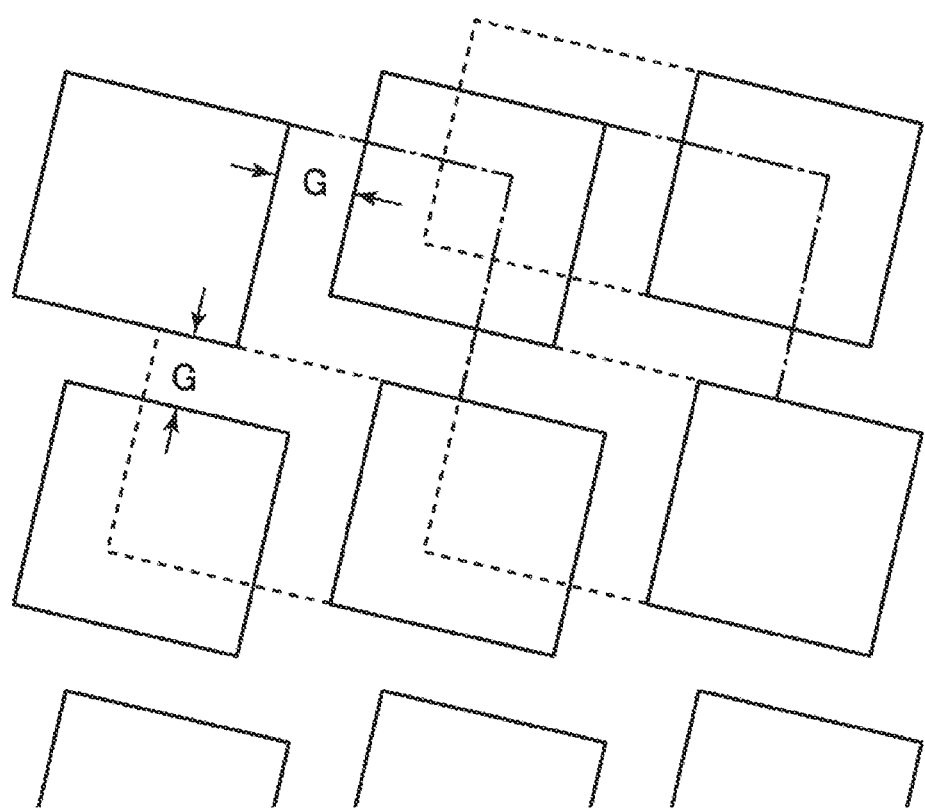
FIG. 7 is a plan view schematically illustrating the image of the LED array according to the alternative example together with the shifted image.

FIG. 7 illustrates a case where the distribution of the LED array is along the horizontal (row) direction and the vertical (column) direction, but the sides of respective LED chips are rotated by a certain angle from the horizontal direction and the vertical direction. The shape of the dark grid becomes zigzag. The width of the dark grid between adjacent LED chips is G, but the area of the crossing region of the dark grids becomes 2G×2G. When the crossing region of the dark grids is divided into upper and lower (two) regions, the upper crossing region can be occupied by the leftward-downward shift of the upper right side chip and the lower crossing region can be occupied by the rightward-upward shift of the lower left side chip, to distinguish the dark grids.

Figure 12A:
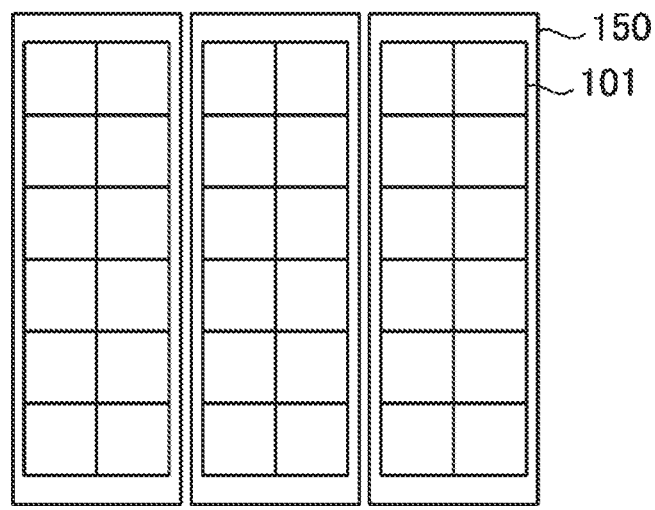
FIGS. 12A-12C are a schematic plan view of a light source including an arrangement of LED array according to an alternative example, a schematic plan view in which only light emitting surfaces are taken out, and a schematic plan view of the image thereof together with the shifted image.

FIG. 12A illustrates a structure wherein succeeding elements are monolithically manufactured to constitute intermediate element group to be distributed on a support substrate, and a plurality of intermediate element groups are distributed on a support substrate aligned in the horizontal direction, in parallel to the horizontal direction, i.e. the vehicle width direction. In the figure, succeeding elements having a distribution of 2 columns by 6 rows of LED chips 101 constitutes an intermediate element 150. It is not necessary that the intermediate element has plural columns and plural rows. The intermediate element includes at least plural rows of light emitting elements. The intermediate elements 150 are aligned in horizontal (row) direction. Gap between adjacent chips in the intermediate element 150 is considerably narrow. There is formed non-light-emitting region around the succeeding elements. Even when the intermediate elements are aligned close to mutually contacting state, the gap between the intermediate elements is larger than the gap between the succeeding elements.

Figure 12B:
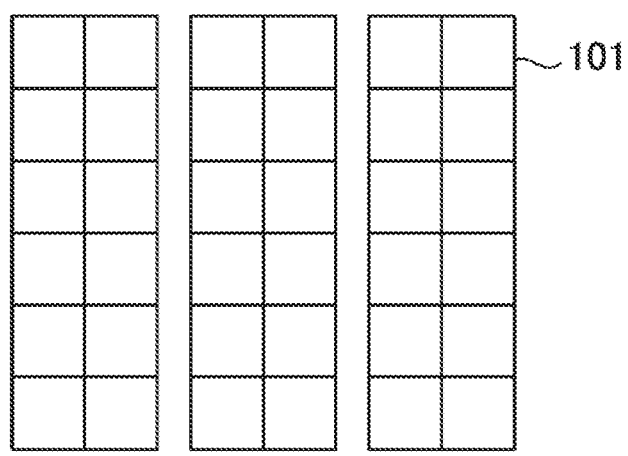

FIG. 12B is a figure in which only the light emitting areas are derived from FIG. 12A. Wide width dark grids between the succeeding elements should be distinguished. Narrow non-light-emitting regions between the succeeding elements become dark grids even when they have narrow widths.

Figure 12C:
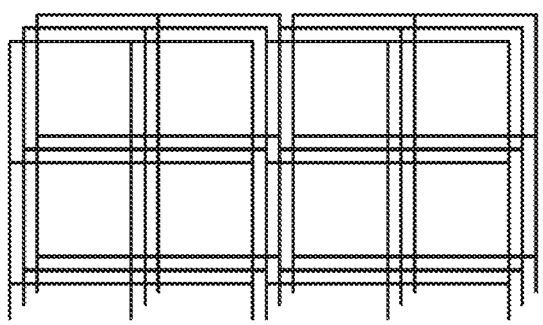

FIG. 12C illustrates a state wherein the light emitting regions of the succeeding elements illustrated in FIG. 12B are shifted in both senses in the direction slanted with respect to the horizontal direction, and superposed on the original image. When the image shifted in upper right direction is superposed on the original image, the wide width dark grids are almost extinguished, but in the shifted image there exist also narrow width dark grids. When the image shifted in lower left direction is also superposed, it is effective to extinguish the dark grids in the intermediate element because images having different positions in width direction and height direction are superposed.

Figure 8A:
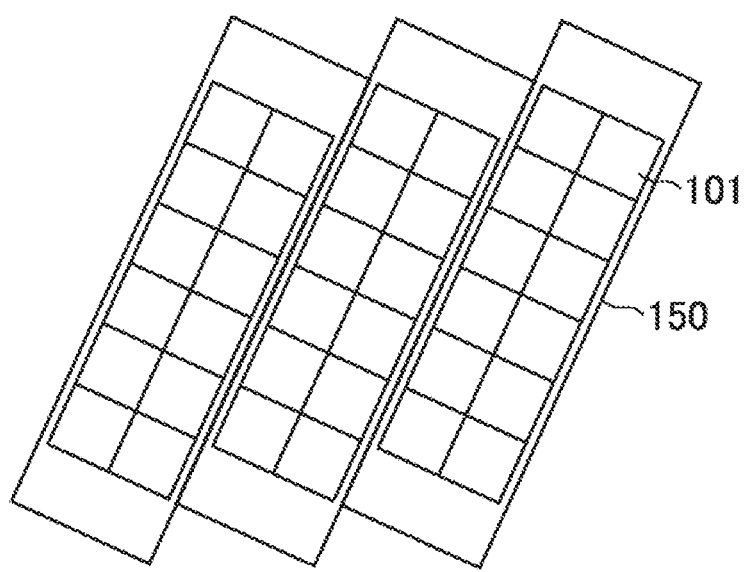
FIGS. 8A-8C are schematic plan view of a light source including an arrangement of an LED array according to an alternative example, schematic plan view in which only the light emitting surfaces are taken out, and a schematic plan view illustrating the image thereof together with the shifted image.

FIG. 8A illustrates a structure wherein succeeding elements are monolithically manufactured to constitute intermediate element group to be distributed on a support substrate, and a plurality of intermediate elements, slanted obliquely with respect to the horizontal direction which is the vehicle width direction, are distributed on a support substrate aligned in the horizontal direction. In the figure, succeeding elements having a distribution of 2 columns by 6 rows of LED chips 101 constitute an intermediate element 150. It is not necessary that there are plural columns and plural rows. The intermediate element includes at least plural rows of light emitting elements. The intermediate elements 150 are aligned in horizontal (row) direction in obliquely slanted state. The gap between the adjacent chips in the intermediate element 150 is considerably narrow. There is formed non-light-emitting region around the succeeding elements. Even when the intermediate elements are aligned close to mutually contacting state, the gap between the intermediate elements is larger than the gap between the succeeding elements.

Figure 8B:
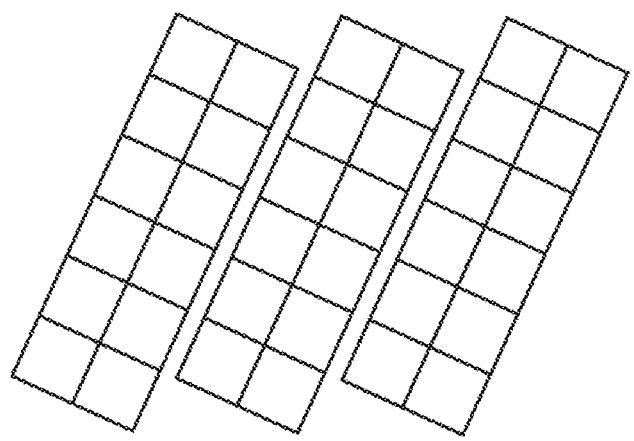
Figure 8C:
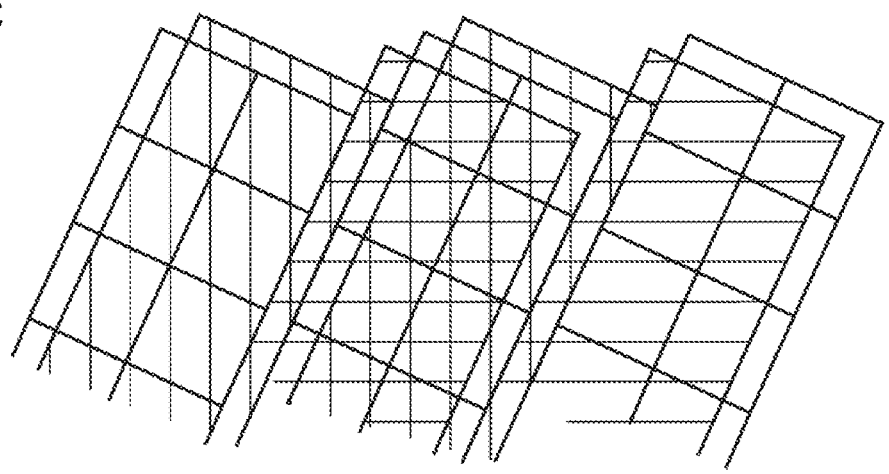

FIG. 8B is a figure in which only the light emitting areas are derived from FIG. 8A. FIG. 8C illustrates a state in which the light emitting areas of the succeeding elements illustrated in FIG. 8B are shifted in the horizontal direction and in both senses and are superposed on the original image. When the image shifted rightward is superposed on the original image, the wide width dark grid is almost extinguished, but in the shifted image there exist also narrow width dark grids. When the image shifted leftward is also superposed, it is effective to extinguish the dark grids in the intermediate elements because images having different positions in width direction and height direction are superposed.

Description has been made on the present invention along the embodiments, but these do not have limiting means. Exemplified materials, numerical values, etc. are only examples unless otherwise specified and are not limitative. Further, it will be apparent for those skilled in the art that various substitutions, improvements, addition of publicly known members, etc. are possible.

POSSIBILITY OF INDUSTRIAL UTILIZATION

It is possible to utilize the invention in lamp device for illuminating the front view, for example vehicle headlamp etc.

What is claimed:

1. A lamp device comprising:
    a light source for supplying a light beam, including a plurality of light emitting elements regularly arranged on a support plane, wherein said light emitting elements are aligned along a first direction and along a second direction crossing said first direction on said support plane;
    a beam splitter for dividing the light beam into a plurality of light beams directed to different directions along a third direction which is at an angle with respect to the first and the second directions;
    wherein said beam splitter comprises a prism with a surface having differently slanted portions;
    wherein said prism is a trapezoid prism having a flat central portion passing input light without changing direction, and a pair of slanted surface portions sandwiching the flat central portion and slanted in opposite directions refracting input lights in opposite directions; and
    a projection optic system for forming images of the respective light emitting elements of the light source from the divided light beams on an image plane,
    wherein the images of the respective light emitting elements of said light source including a pair of images mutually shifted in a direction crossing said first and second directions, each of the images of the divided light beams having dark portions not illuminated, and combination of the respective images of the divided light beams having no dark portion on the image plane; and
    wherein distance between adjacent ones of the light emitting elements in said first direction is G1, distance between adjacent ones of the light emitting elements in said second direction is G2, and said pair of slanted surface portions form moved image by moving a basic image in the first direction by +G1 or more, and in said second direction by +G2 or more.

2. The lamp device as defined in claim 1, wherein said beam splitter can form a second moved image further on the image plane, wherein the second moved image is formed by moving said basic image along said first direction and said second direction in opposite sense with respect to said first moved image.

3. The lamp device as defined in claim 1, wherein said prism has slanted surfaces elongated in a direction crossing said first direction and said second direction.

4. The lamp device as defined in claim 1, wherein a two dimensional shape of a respective one of said plurality of light emitting elements is a rectangle having first opposing sides and second opposing sides, wherein the plurality of light emitting elements are distributed in a matrix pattern defining a row direction gap between adjacent light emitting elements and a column direction gap between adjacent light emitting elements, wherein the row direction gap and the column direction gap cross each other to form a cross region.

5. The lamp device as defined in claim 4, wherein said prism has slanted surfaces, and a direction in which said prism shifts an image is along a diagonal direction of said crossing region.

6. The lamp device as defined in claim 5, wherein said lamp device is a vehicle headlamp which illuminates a region long in vehicle width direction and short in vertical direction.

7. The lamp device as defined in claim 1, further comprising:
    a second light source such that the first light source and second light source form left and right vehicle headlights, respectively, and the lamp device further includes a light distribution control unit and a front monitoring unit.

8. The lamp device as defined in claim 7, wherein
    the front monitoring unit is connected with an on-vehicle camera, a radar, and a vehicle speed sensor 112, the front monitoring unit configured to transmit data to the light distribution control unit, and
    the light distribution control unit is connected to a vehicle speed sensor, a steering angle sensor, and a GPS navigation and the light distribution control is configured to determine a pattern based on attributes of objects located on a travel path of the vehicle headlights.

9. The lamp device as defined in claim 7, wherein
    the light source includes a matrix of LEDs, and the light distribution control unit is configured to control power to respective LEDs of the matrix of LEDs required for realizing a particular light distribution, and
    the image shifter is configured to divide light emitted from the light source into a plurality of groups, and the lamp device further including a projection optic system including a projection lens configured to project the groups of light onto the image plane.

10. A lamp device comprising:
    a support substrate long in vehicle width direction;
    a light source for supplying a light beam including a plurality of intermediate elements disposed on said support substrate, each of the intermediate elements including succeeding light emitting elements disposed in plural rows, wherein the plurality of intermediate elements are arranged parallel to said vehicle width direction, and form gaps between the plural intermediate elements;
    a beam splitter for dividing the light beam into a plurality of light beams directed to different directions along a third direction which is at an angle with respect to the first and the second directions;
    wherein said beam splitter comprises a prism with a surface having differently slanted portions;
    wherein said prism is a trapezoid prism having a flat central portion passing input light without changing direction, and a pair of slanted surface portions sandwiching the flat central portion and slanted in opposite directions refracting input lights in opposite directions; and
    a projecting optic system or forming images of the respective light emitting elements of said light source from the divided light beams on an image plane;
    an image shifter capable of forming a basic image of said light source on the image plane, and moving said basic image in both senses in a slanted direction with respect to said vehicle width direction, wherein amount of shift of the image exceeds width of said gap, and boundaries between the succeeding elements in images shifted from both sides of the gap have different positions.

11. The lamp device as defined in claim 10, wherein succeeding elements of said respective intermediate elements include light emitting elements disposed in plural rows, and gap between said intermediate elements is larger than gap between said succeeding elements.

12. A lamp device comprising:
a light source for supplying a light beam, including a plurality of light emitting elements regularly arranged on a support plane, wherein said light emitting elements are aligned along a first direction and along a second direction crossing said first direction on said support plane; and
an optical system for dividing the light beam into a plurality of light beams directed to different directions along a third direction which is at an angle with respect to the first and the second directions, and forming images of the respective light emitting elements of the light source from the divided light beams on an image plane, wherein the images of the respective light emitting elements of said light source including a pair of images mutually shifted in a direction crossing said first and second directions, each of the images of the divided light beams having dark portions not illuminated, and combination of the respective images of the divided light beams having no dark portion on the image plane;
a beam splitter for dividing the light beam into a plurality of light beams directed to different directions along a third direction which is at an angle with resect to the first and second directions;
wherein said beam splitter comprises a prism with a surface having differently slanted portions;
wherein said prism is a trapezoid prism having a flat central portion passing input light without changing direction, and a pair of slanted surface portions sandwiching the flat central portion and slanted in opposite directions refracting input lights in opposite directions;
wherein a distance between adjacent ones of the light emitting elements in said first direction is G1, distance between adjacent ones of the light emitting elements in said second direction is G2, and said pair of slanted surface portions form moved image by moving a basic image in the first direction by +G1 or more, and in said second direction by +G2 or more.

13. The lamp device of claim 12, wherein the third direction is perpendicular with respect to the first and the second directions.

14. The lamp device according to claim 12, wherein the optical system comprises a lens body including a plurality of regions having different focal points.

15. The lamp device according to claim 14, wherein the lens has a surface divided into the plurality of regions.

16. The lamp device according to claim 14, wherein the plurality of regions includes two regions.

17. The lamp device according to claim 14, wherein the plurality of regions includes four regions.

* * * * *